UNITED STATES PATENT OFFICE.

MAX POPPE, OF BIELEFELD, GERMANY.

PRODUCT FOR USE IN MAKING MARGARIN.

SPECIFICATION forming part of Letters Patent No. 658,529, dated September 25, 1900.

Application filed March 13, 1900. Serial No. 8,540. (No specimens.)

*To all whom it may concern:*

Be it known that I, MAX POPPE, a subject of the King of Prussia, Emperor of Germany, and a resident of Bielefeld, in the German Empire, have invented certain new and useful Improvements in the Manufacture of Margarin; and I do hereby declare the following to be a full, clear, and exact description of the invention, such as will enable others skilled in the art to which it appertains to make and use the same.

The present invention relates to a novel product intended for imparting to margarin or artificial butter the aroma and taste of natural butter. The agreeable aroma of natural butter is due to the separation of free fatty acids from the various kinds of fats of which natural butter is composed. These fats are glycerids, according to their chemical nature.
The decomposition of the glycerids resulting in the liberation of the free fatty acids which produce the aroma of natural butter is generally caused by bacteria and by the influence of light and air. When the separation of free fatty acids has once set in in its natural way, then it goes on continuously until finally the butter contains too great a quantity of free fatty acids, and consequently becomes rancid. Good natural butter, therefore, is liable to get easily rancid on account of the spontaneous separation of fatty acids above referred to. Among the free fatty acids thus formed by the spontaneous decomposition of the glycerids is butyric acid, and it has been suggested to use butyric acid as an artificial aroma to be added to margarin or artificial butter in order to make it more like natural butter by imparting thereto a pleasant aromatic-acid taste and odor. However, the use of butyric acid as an aroma for margarin and artificial butter has been abandoned.

I have discovered that the volatile fatty acids contained in normal natural butter form an excellent aroma for margarin, since they cause the agreeable aroma in natural butter. These volatile fatty acids are obtained by saponifying normal natural butter, then freeing all the fatty acids, and separating the volatile fatty acids by distillation. I have further found that a relatively-small quantity of this product is capable of imparting to a comparatively-large quantity of margarin the agreeable aroma peculiar to natural butter. This product, added to margarin or artificial butter, does not embody therein substances or components of natural butter which are liable to become rancid during or after a considerable time of storing.

The above product forms the subject-matter of my invention. It consists principally of capronic acid, capric acid, caprylic acid, butyric acid, pelargonic acid, traces of myristic acid, and other volatile fatty acids which are isomeric therewith. These volatile acids are contained in natural butter in the form of glycerids and readily freed by the stronger mineral acids—for instance, by diluted sulfuric acid. The described product may be mixed with margarin or artificial butter during the process of producing the same, and the operations of washing, rolling, and kneading eliminate it only slightly, so that the agreeable aroma of natural butter remains in the margarin.

The product of the present invention consists of a number of free volatile fatty acids. It contains butyric acid. This, however, forms but one component of same, and therefore my product is substantially different from pure butyric acid. This product is obtained in the following manner: Normal natural butter is saponified according to any of the well-known chemical methods, then the fatty acids are set at liberty by the action of a mineral acid, preferably diluted sulfuric acid, and then the volatile fatty acids are distilled off, preferably in a vacuum device, at correspondingly-low temperature until the distillate corresponds to about ten times the weight of the natural butter taken under treatment. The manufacture of this product may practically be carried out as shown in the following example: One hundred parts of normal natural butter are saponified with an alcoholic solution of caustic soda prepared by dissolving about thirty to forty parts, by weight, of the caustic soda in about one hundred parts, by weight, of absolute alcohol. Then the alcohol is evaporated from the resulting soapy mass from which the unsaponified matter has not been separated and the residue obtained dried in vacuo. The dried soap is then dissolved in fifteen times its weight of water and the aqueous solution decomposed with the corresponding quantity of diluted sulfuric acid, (about one part of sulfuric acid to four parts of water,) whereby the fatty acids are freed. From this mixture the volatile fatty acids are isolated by distillation in vacuo—i. e., under reduced pressure. The distillation is carried on at the lowest temperature possible—say from 50° to 60° centigrade or upward—until the distillate will weigh about ten times the original weight of the butter used. This distillate thus obtained contains the necessary quantity of volatile fatty acids for imparting the pleasant aroma and taste of natural butter to about one hundred thousand parts, by weight, of margarin or artificial butter without risk of causing it to become rancid. One part, by weight, of the distillate is therefore sufficient to aromatize one hundred parts, by weight, of margarin or artificial butter. Instead of directly using the product thus obtained by distillation the volatile fatty acids may be extracted from the distillate by ether and then dissolved in alcohol or potable fatty oil and added in this condition to margarin or artificial butter. The addition of the aroma described may take place during the process of manufacturing the margarin after an emulsion of the fat and the milk has been made. The quantity of aroma employed may vary within certain limits, and margarin produced with this aroma will keep well and for many months, because there are no decomposable glycerids present, which when acted upon by light and air would tend to make the margarin rancid. In natural butter, however, the decomposition of the glycerids is going on continuously, and therefore the same is liable to become rancid.

Having thus described my invention, I claim as new and desire to secure by Letters Patent—

1. As a new article of manufacture, a product for aromatizing margarin and artificial butter derived from natural butter, by saponifying same, liberating the fatty acids, and distilling off under reduced pressure the volatile fatty acids, and consisting essentially of the volatile fatty acids of the natural butter, as specified.

2. As a new article of manufacture, a product for aromatizing margarin and artificial butter, derived from natural butter by saponifying same, liberating the fatty acids, and distilling off under reduced pressure the volatile fatty acids, and consisting essentially of capronic acid, capric acid, caprylic acid, butyric acid, pelargonic acid, and volatile fatty acids being isomeric therewith, substantially as described.

In testimony that I claim the foregoing as my invention I have signed my name in presence of two subscribing witnesses.

MAX POPPE.

Witnesses:
F. E. MALLETT,
KARL SCHMITT.